Jan. 28, 1969
A. NECTOUX
3,424,102
ANTI-COLLISION FACILITY USED FOR TWO MOVING
VEHICLES TRAVELLING ON THE SAME TRACK
Filed May 23, 1967
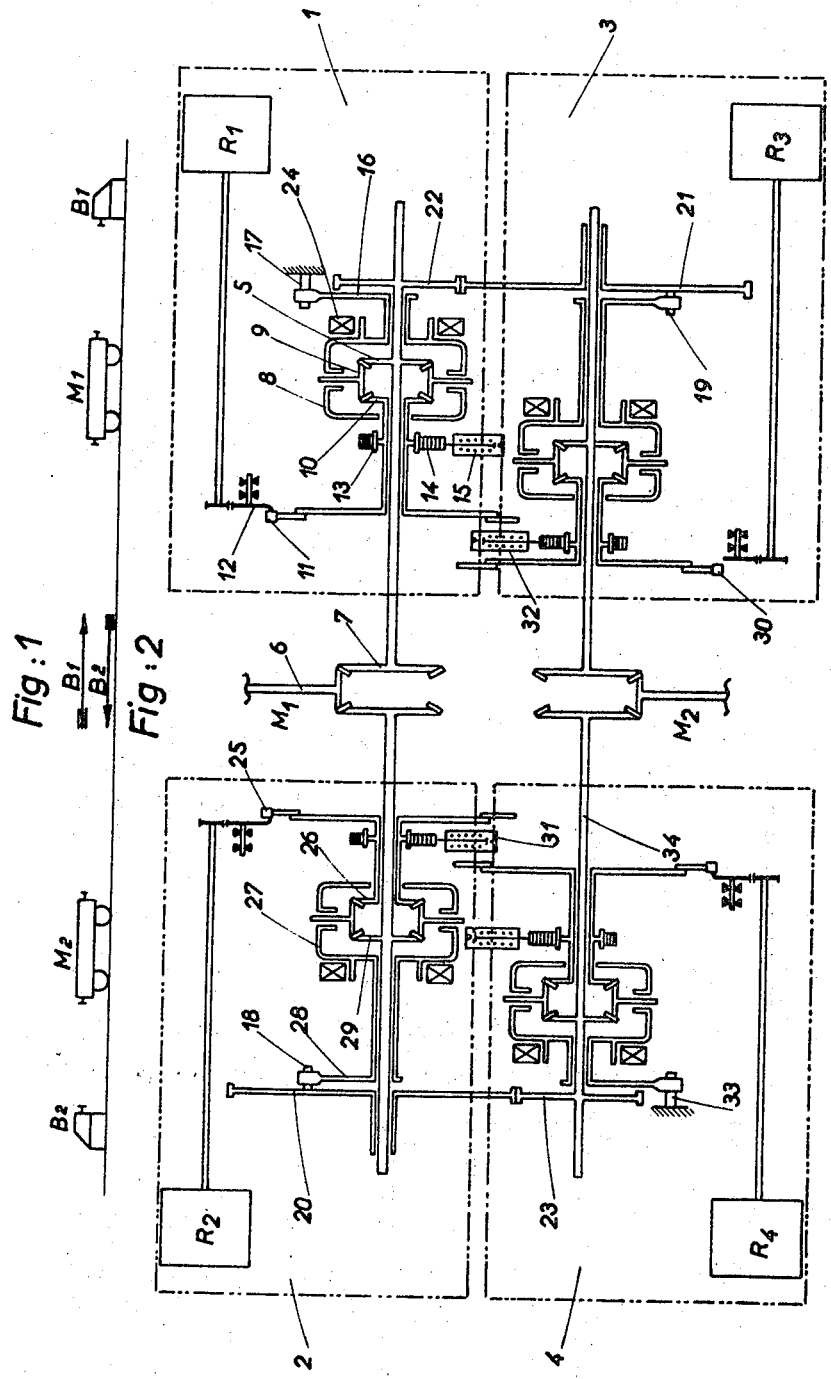

3,424,102
ANTI-COLLISION FACILITY USED FOR TWO MOVING VEHICLES TRAVELLING ON THE SAME TRACK
Andre Nectoux, Le Creusot, France, assignor to Societe des Forges et Ateliers du Creusot, Paris, France, a company of France
Filed May 23, 1967, Ser. No. 640,634
Claims priority, application France, May 26, 1966, 63,111
U.S. Cl. 104—152         2 Claims
**Int. Cl. B61b *13/00;* B61c *3/00;* F16h *35/02***

ABSTRACT OF THE DISCLOSURE

A collision preventive device designed for two moving bodies, embodying for each travelling direction of each moving body decelerating gear, incorporating a differential gear, a planetary wheel of which is driven by an element representing the moving body location, a casing of said differential gear being equipped with a lever free to cooperate with a thrust stop, in which differential gear each thrust stop of the two decelerating gears corresponding to the coming close to one another of the two moving bodies is so mounted as to rotate about the differential shaft associated therewith, and the thrust stop which causes one of the moving bodies to decelerate is connected through a gear set to a component made dependent on the location of the other moving body so that said thrust siop is caused to come nearer to the lever against which it is to butt as the two moving bodies come closer the one to the other, and conversely.

---

The invention relates to an anti-collision facility used for two moving vehicles travelling on the same track. The facility is of use, for instance, in cases in which two vehicles, such as trucks carrying iron and steel products travel in the same track.

The invention is of use in the case in which the facility comprises, for each direction of travel of each moving vehicle a decelerating mechanism comprising: a differential having a first sun-wheel retained by a resilient return member; a second sunwheel driven by an element representing the position of the moving vehicle; and a differential cage having a lever adapted to co-operate with an abutment, a member being provided to operate a decelerating rheostat when, upon such lever making contact with its abutment, the first sun-wheel is rotated against the force of its resilient retaining member.

According to the invention, each abutment of the two decelerating mechanisms corresponding to movement of the two moving vehicles towards one another is rotatably mounted around the shaft of the differential associated with it, and the abutment initiating deceleration of any of the moving vehicles is connected by a kinetic chain to a member dependent upon the position of the other moving vehicle so that the last-mentioned abutment moves towards the lever which it is required to abut when the two vehicles move towards one another and vice versa.

The invention will be described in greater detail with reference to an exemplary embodiment shown in the drawings wherein:

FIGURE 1 shows two moving vehicles which travel on the same track, the same being limited by two buffer stops or the like, and FIGURE 2 is a diagrammatic view of an anticollision facility according to the invention.

Referring to FIGURE 2, each moving vehicle, $M_1$, $M_2$ has two decelerating mechanisms 1, 2 ($M_1$) and 3, 4 ($M_2$). Each such mechanism comprises a respective decelerating rheostat $R_1$, $R_2$, $R_3$, $R_4$ for deceleration and speed control of each of the two vehicles $M_1$, $M_2$ in both directions of travel. Mechanism 1 comprises a differential having a sun-wheel 5 driven by a shaft 6 via a bevel gear system 7. The differential also comprises a cage 8 having satellites 9 which engage with sun-wheel 5. A second sun-wheel 10 is rigidly secured to a disc bearing a cam 11 adapted to act on a rocker 12 adapted to operate rheostat $R_1$ to decelerate vehicle $M_1$. The shaft of sun-wheel 10 has a gear-wheel 13 which meshes with a toothed rack 14 adapted to move lengthwise against the force of a resilient member, for instance, a spring 15; the same therefore tends to keep the rack 14, and therefore the sun-wheel 10, stationary in a position such that rheostat $R_1$ has no decelerating action. Cage 8 has a lever 16 adapted to contact a stationary abutment 17.

The four decelerating mechanisms are of identical construction except that mechanisms 2 and 3 comprise abutments 18, 19 respectively mounted on rotatable gear-wheels 20, 21 respectively. Mechanism 1 serves to decelerate vehicle $M_1$ when the same is moving in the direction indicated by an arrow $B_1$ (FIGURE 1), mechanism 2 serves to decelerate vehicle $M_1$ when the same is moving in the direction indicated by an arrow $B_2$, mchanism 3 serves to decelerate vehicle $M_2$ when the same is moving in the direction indicated by arrow $B_1$, and mechanism 4 serves to decelerate vehicle $M_2$ when the same is moving in the direction indicated by arrow $B_2$. During the time when either vehicle is accelerating, the cam which has initiated the previous deceleration of such vehicle is repositioned by the corresponding return member. For instance, when vehicle $M_1$ accelerates in direction $B_2$, the resilient return integer 15 returns cam 11, rocker 12 and rheostat $R_1$. During normal running conditions the cams are kept stationary by the return members.

According to the invention, the position of the abut ment 18 or 19 which stops the movement of the corresponding cage of the differential associated with either of the moving vehicles is associated with the position of the other moving vehicle. For instance, as FIGURE 2 shows, to decelerate vehicle $M_1$ in direction $B_2$, abutment 18 is associated with the position of vehicle $M_2$, and to decelerate the same in the direction $B_1$, abutment 19 is associated with the position of vehicle $M_1$. This association or connection is by way of a gear meshing with each of the gears 20 and 21. In mechanism 1 a gear 22 meshes with gear 21 bearing rotatable abutment 19, and in mechanism 4 a gear-wheel 23 meshes with gear-wheel 20 bearing rotatable abutment 18. Each decelerating mechanism also comprises a brake, as the brake 24 shown in FIGURE 2 for mechanism 1, which brakes the cage of the corresponding differential and determines the operation of the decelerating rheostat, in which event the sun-wheel of the mechanism bearing the cam acting on the rocker starts to rotate.

The various forms of operation of the anti-collision facility will now be studied with reference to the drawings. One possible case is when either vehicle is stationary somewhere on the track and the other vehicle is moving towards it. For instance, it will be assumed that vehicle $M_2$ is stationary and vehicle $M_1$ is moving in the direction $B_2$. In this event, abutment 18, which is associated with the movements of vehicle $M_2$ by way of gear-wheels 20, 23 and shaft 34 driven by the movement of vehicle $M_2$, is stationary and indicates the position of $M_2$. During times when vehicle $M_1$ is accelerating and running normally, cam 25 of mechanism 2, sun-wheel 26 thereof and rheostat $R_2$ are stationary. Cage 27 associated with vehicle $M_1$ is therefore rotating and lever 28 moves towards abutment 18. When vehicle $M_1$ reaches a position at a predetermined distance away from vehicle $M_2$, for instance X metres therefrom, lever 28 abuts abutment 18, so that rheostat $R_2$ operates and decelerates vehicle $M_1$. The rate of deceleration applied corresponds to the normal rate since the movement imparted to the rheostat is derived solely from sun-wheel 29 associated with the movements of vehicle $M_1$, abutment 18 being stationary. Operation is the same when vehicle $M_1$ is stationary and vehicle $M_2$ is travelling in the direction indicated by the arrow $B_1$.

Another case in which the anti-collision facility operates is the case in which the two vehicles are moving towards one another, $M_1$ moving in the direction of the arrow $B_2$ and $M_2$ moving in the direction of the arrow $B_1$. During acceleration and normal running times, the decelerating rheostats $R_2$ (for vehicle $M_1$) and $R_3$ (for vehicle $M_2$) are stationary since the respective resilient restoring facilities 31, 32 maintain the corresponding actuating cams 25, 30 in abutting relationship. The movement of vehicle $M_1$ is transmitted via sun-wheel 26 to cage 27 and lever 28. The position of vehicle $M_2$ is represented by abutment 18 which is associated, via gear-wheels 20, 23 and shaft 34, with the movement of vehicle $M_2$. When the distance between the two vehicles $M_1$ and $M_2$ becomes a predetermined number of metres, for instance X metres, the lever 28 has its direction of rotation reversed because of the movement of the rotating abutment 18. The resulting movement imposed on sun-wheel 26, cam 25 and rheostat $R_2$, such movement being the result of the rotation of sun-wheel 29 in dependence upon the movement of $M_1$ and of the rotation of cage 27, whose direction of rotation has reversed, is faster than the movement imparted in normal deceleration. Similarly, rheostat $R_3$ of vehicle $M_2$ is rotated when the distance between $M_2$ and $M_1$ becomes equal to a predetermined amount, for instance Y metres, Y denoting the deceleration distance of vehicle $M_2$. If Y is less than X, rheostat $R_3$ starts to rotate after rheostat $R_2$.

Consequently, the rates of electrical deceleration set by the rheostats $R_2$, $R_3$ may quite considerably exceed the normal rates and be incompatible with what the equipment can withstand. In this event, the safety brakes of each vehicle must be operated immediately reversal of the hand of rotation of any cage has been detected.

Another case in which the anti-collision facility according to the invention is of use is the case in which one of the vehicles, travelling faster than the other, is moving in pursuit of the slower vehicle; for instance, it will be assumed that vehicle $M_1$ is moving in pursuit of vehicle $M_2$. Rheostat $R_2$ of vehicle $M_1$ is stationary during acceleration and normal running times. The sun-wheel 29 associated with the movement of $M_1$ drives cage 27 and its lever 28. Abutment 18 associated with the movement of $M_2$ is also rotating to the same hand. When the distance between $M_1$ and $M_2$ becomes X metres, lever 28 catches up with abutment 18. Upon contact the cam 25 and rheostat $R_2$ are driven, because of the abrupt reduction in the speed of cage 27, rheostat $R_2$ then reducing the speed of vehicle $M_1$. During this deceleration the movement imparted to rheostat $R_2$ is due to the rotation of sun-wheel 29, associated with $M_1$, and to rotation to the same hand of the abutment 18 which is associated with $M_2$ and which acts on cage 27. The movement imparted to rheostat $R_2$ is the result of two rotations to the same hand and is therefore slower than in a normal deceleration; consequently, the rate of deceleration imparted to vehicle $M_1$ is less than normal and the electrical equipment can withstand the deceleration in all cases.

When the speed of vehicle $M_1$ becomes the same as the speed of vehicle $M_2$, the speed of the lever 28 due to the abutment 18 associated with $M_2$, and the speed of the sun-wheel 29 associated with $M_1$, are such that sun-wheel 26, and therefore rheostat $R_2$, stop by virtue of the various gear ratios, whereafter the two vehicles follow one another at the same speed. If vehicle $M_2$ is then decelerated, abutment 18 and therefore lever 28 are also decelerated. The fresh rotation of the rheostat $R_2$ slows down vehicle $M_1$.

Each of the vehicles $M_1$, $M_2$ can stop against the corresponding end buffer stops $B_1$, $B_2$. Deceleration for stopping at the buffer stops is produced by the stationary abutment 17 (for the mechanism 1) and 33 (for the mechanism 4), so that there is no risk of the moving vehicles colliding with their buffer stops. The moving vehicles can be stopped anywhere along their track by operation of one of the brakes, such as the brake 24 acting on the corresponding cage, for instance, cage 8 of mechanism 1. Each brake can be controlled either manually or automatically by an electrical or electromechanical selector system.

The anti-collision facility hereinbefore described covers all failures whether due to the operator or to the selector system or to faulty operation of the brakes such as the brakes 24.

The invention is not of course limited by the details of the embodiment hereinbefore described and such details can vary without departure from the scope of the invention.

What is claimed is:

1. An anti-collision facility for two moving vehicles which travel on the same track comprising, for each direction of travel of each moving vehicle a decelerating mechanism comprising: a differential having a first sun-wheel retained by a resilient return member; a second sun-wheel driven by an element representing the position of the moving vehicle; and a differential cage having a lever adapted to co-operate with an abutment, a member being provided to operate a decelerating rheostat when, upon such lever making contact with its abutment, the first sun-wheel is rotated against the force of its resilient retaining member, characterised in that each abutment of the two decelerating mechanisms corresponding to movement of the two moving vehicles towards one another is rotatably mounted around the shaft of the differential associated with it, and the abutment initiating deceleration of any of the moving vehicles is connected by a kinetic chain to a member dependent upon the position of the other moving vehicle so that the last-mentioned abutment will move towards the lever which it is required to abut when the two vehicles move towards one another and vice versa.

2. An anti-collision facility as set forth in claim 1, characterised in that the kinetic chain comprises a gear-wheel rigidly secured to the shaft of the second sun-wheel of one of the decelerating mechanisms, in engagement with a gear-wheel bearing the rotatable abutment of another decelerating mechanism.

References Cited

UNITED STATES PATENTS 2,381,604   8/1945   Lassen _____ 105—61

ARTHUR L. LA POINT, *Primary Examiner.*

DANIEL F. WORTH III, *Assistant Examiner.*

U.S. Cl. X.R.

74—394; 104—153; 105—61